United States Patent

[11] 3,542,464

| [72] | Inventor | Panayotis Constantine Dimitracopoulos<br>P.O. Box 458, Outremont, Montreal 154,<br>Quebec, Canada |
|---|---|---|
| [21] | Appl. No. | 722,775 |
| [22] | Filed | April 19, 1968 |
| [45] | Patented | Nov. 24, 1970 |

[54] COMPACT AUTOMATIC SLIDE PROJECTOR
14 Claims, 8 Drawing Figs.

[52] U.S. Cl. .................................................. 353/57,
353/116
[51] Int. Cl. ...................................................... G03b 21/18
[50] Field of Search.......................................... 353/57,
103, 115, 114, 116, 111, 112

[56] References Cited
UNITED STATES PATENTS

| 2,537,429 | 1/1951 | Seyler............................. | 353/103 |
| 2,779,236 | 1/1957 | Pollan ........................... | 353/61 |
| 2,922,334 | 1/1960 | Krull ............................. | 353/103 |
| 2,969,711 | 1/1961 | Robinson et al. ............. | 353/116(X)UX |
| 3,138,062 | 6/1964 | Maiershofer .................. | 353/57(X)UX |
| 3,242,804 | 3/1966 | Brinkmann .................... | 353/59 |

*Primary Examiner*—William D. Martin, Jr.

ABSTRACT: An automatic slide projector whose frame is also its magazine tunnel, and whose principal slide-changing element is a U-shaped member straddling the magazine tunnel.

Patented Nov. 24, 1970
3,542,464
Sheet 1 of 3
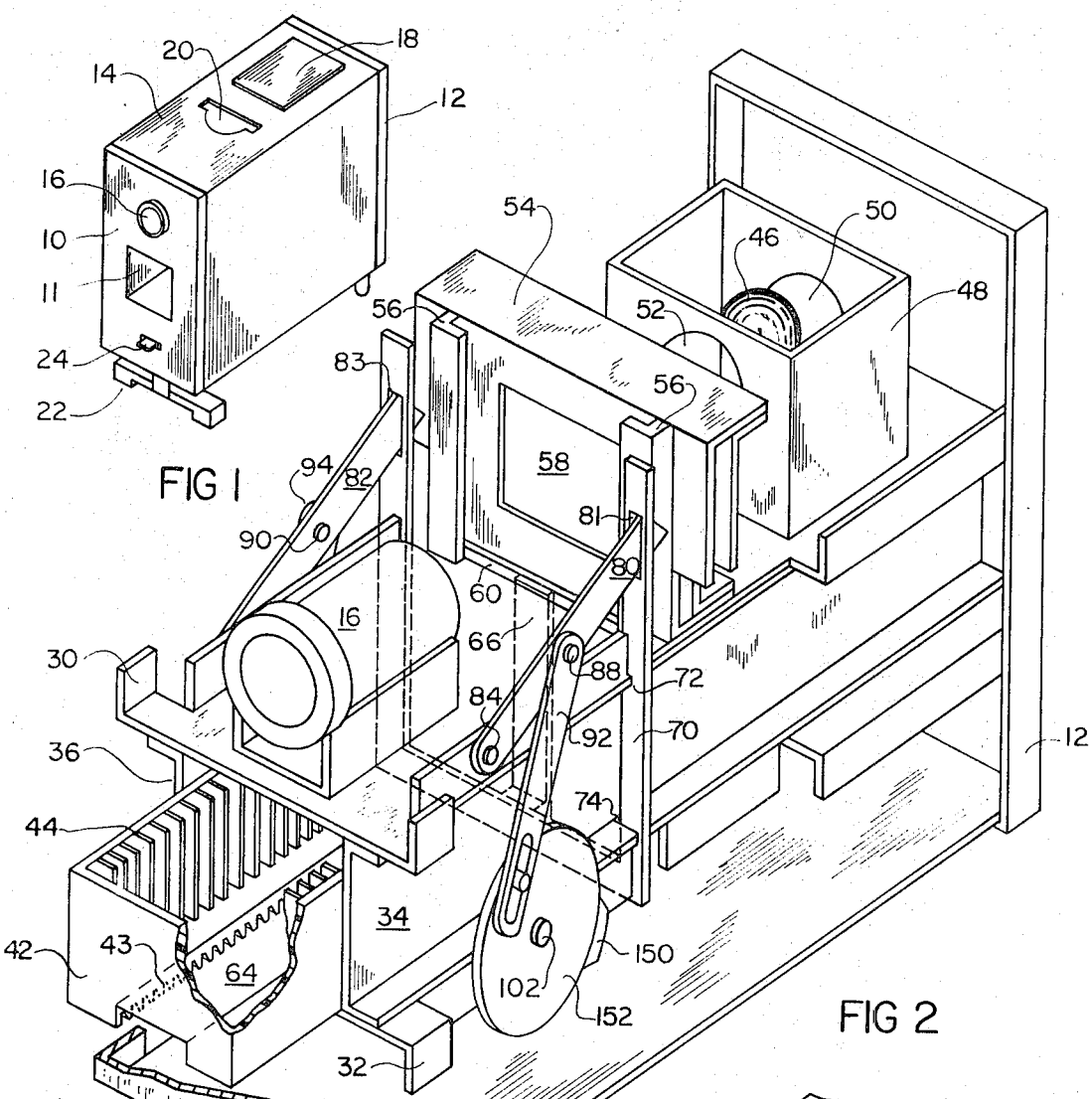
FIG 1
FIG 2
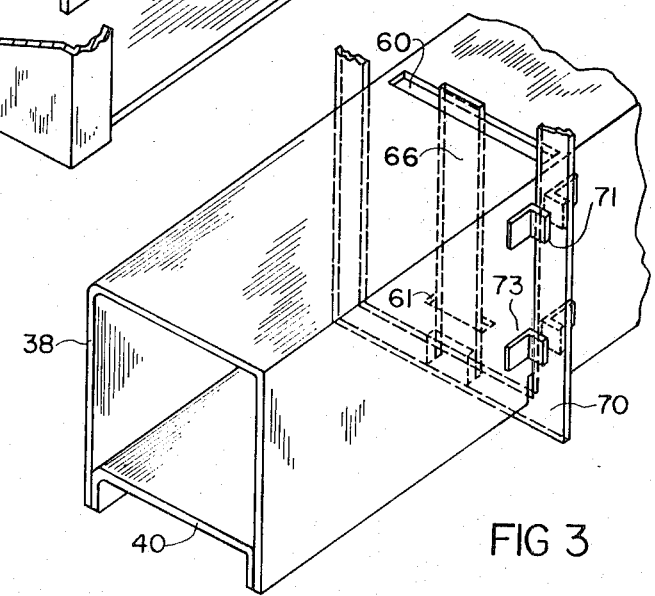
FIG 3

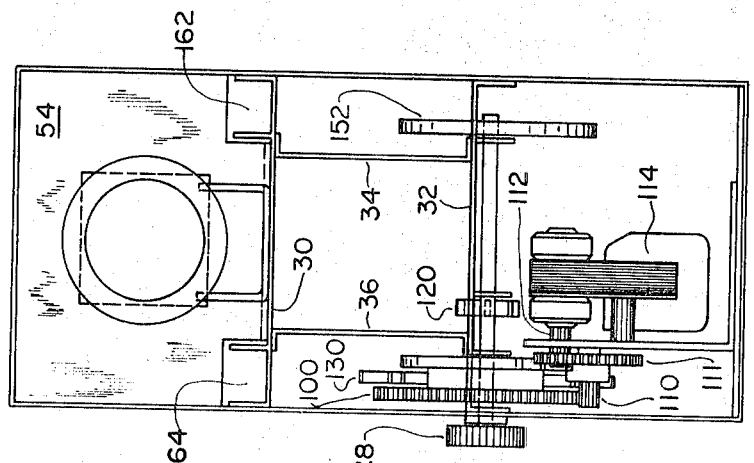
FIG 5
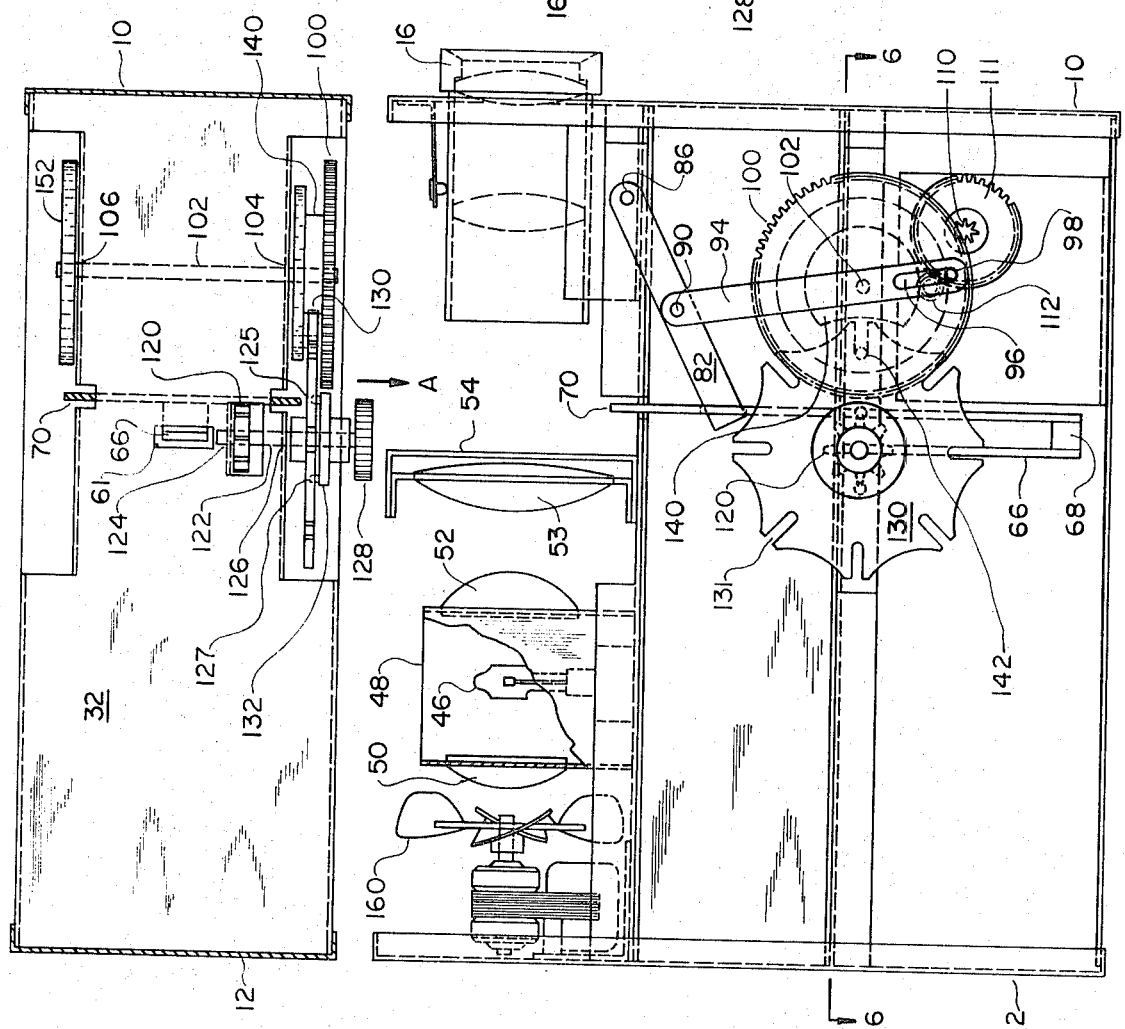
FIG 6
FIG 4

3,542,464

COMPACT AUTOMATIC SLIDE PROJECTOR

FIELD OF INVENTION

This invention relates to automatic slide projectors of unitary construction, compact size and lightweight.

DESCRIPTION OF PRIOR ART

Photographic slides have become a popular and acceptable medium for the display of visual information, since they are relatively simple and inexpensive to prepare, both individually and as quantity reproductions, and can be projected to any desired enlargement with good definition and excellent color rendition. Their use in education, entertainment, industrial training, advertising and similar fields is commonplace.

Heretofore, the projectors employed for the projection of photographic slides or transparencies, and particularly the so-called automatic projectors which usually employ a magazine for the storage of the slides, from which they are removed for sequential projection by automatic mechanisms, were large, bulky and heavy, the size and weight being dictated by the complex automatic mechanisms.

OBJECTS OF THE INVENTION is therefore the object of the present invention to provide automatic slide projectors of the highest quality, permitting the projection of slides in an automated fashion, while their size and weight is kept to a fraction of the presently employed apparatuses.

It is a further object of the present invention to provide such projectors incorporating automatic changing mechanisms of great simplicity and reliability, the simplicity and reliability contributing to the lowering of manufacturing costs, minimizing the possibility of mechanical failures, and should such failures occur, greatly facilitating and simplifying the servicing problem.

It is a still further object of the present invention to provide such projectors of unitary design, in which the tunnel containing the slide-carrying magazine, constitutes the principal frame supporting substantially all optical, electrical and mechanical elements, including the slide-changing parts.

It is still another object of the present invention to provide such projectors having their illuminating and projecting elements disposed in a fashion that permits their efficient cooling by appropriate fans and turbines.

Other objects and advantages of the projectors of the present invention will become apparent from the ensuing descriptions, illustrations and claims.

SUMMARY

A family of very compact automatic slide projectors of essentially three-deck construction, the upper deck containing the projection elements, the middle containing the compartmented, slide-carrying magazine and the lower containing the motive power and other mechanical and electrical assemblies, the projectors being of unitary design built around a tunnel of substantially rectangular cross section constituting the above-mentioned middle deck. A guillotine member, slidably supported around the magazine tunnel, lifts individual slides from the magazine into the projection position.

BRIEF DESCRIPTION OF THE DRAWINGS

FIG. 1 is a perspective view of the outside appearance of one preferred embodiment of the projector of the present invention.

FIG. 2 is a perspective view of the apparatus of FIG. 1, with the wraparound cover removed, the front wall partly broken away, and some parts and components not shown for clarity.

FIG. 3 is a perspective view of an alternative form of the magazine tunnel of the projector of FIG. 2.

FIG. 4 is a side elevation of a projector, substantially as that illustrated in FIG. 2, with the wraparound cover removed, the lamp-chimney partly broken away for clarity, and some parts and components not shown.

FIG. 5 is a front elevation of the projector illustrated in FIG. 4, but with the front removed and some parts not shown for clarity.

FIG. 6 is a plan sectional view taken along line 6—6 of FIG. 4, with some parts omitted for clarity.

DESCRIPTION OF THE PREFERRED EMBODIMENTS

Figure 7:
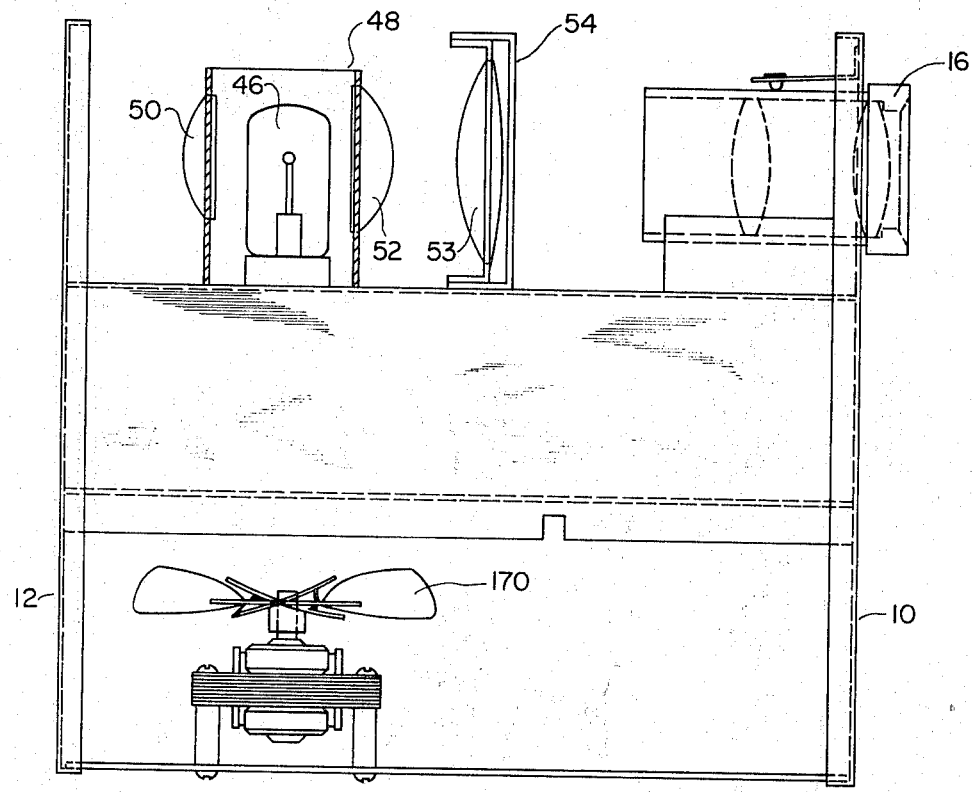
FIG. 7 is a side elevation of an alternative embodiment of the present invention with some parts not shown.

The invention will now be described by reference to certain presently preferred embodiments thereof, but it will be understood by those skilled in the art that the principles of the invention can be carried out by specifically different physical devices, and that in using words of limited meaning for the better understanding of the particulars of the forms chosen for description and illustration, it is not intended to exclude variations of those details which properly fall within the scope of the invention in its broader aspects.

FIG. 1 illustrates in perspective view one very useful and adaptable format which the cabinet of novel projectors of the present invention may take, including a front wall 10, a back wall 12, a wraparound cover 14, a projection lens 16, a cover 18 exposing, upon removal, the projection lamp, a slot 20 for the manual removal of individual slides for editing purposes, a front adjustable leg 22 and its adjusting lever 24. Also a fore-and-aft magazine tunnel 11 adapted to receive a slide magazine (42 in FIG. 2) for indexed motion, to present successive slides to the proper position for vertical motion into projection position.

FIG. 2 illustrates in perspective view the projector of FIG. 1, with the wraparound cover 14 removed and the front wall 10 partly broken away for clarity. It can be seen that the principal structural element of the projector is its magazine tunnel. This magazine tunnel is, in turn, supported by the vertical front wall 10 and back wall 12, and all principal optical, mechanical and other elements are mounted on, or supported by, the above-mentioned magazine tunnel.

The magazine tunnel may be formed, or cast, in metal or plastic or, as illustrated in FIG. 2, it may consist of four U-shaped members 30, 32, 34 and 36 welded, riveted or otherwise secured to one another. It may be also formed of only two members, secured to one another, such as 38 and 40, illustrated in FIG. 3.

The fore-and-aft magazine tunnel slidably contains the usual compartmented box 42, usually called a slide magazine, formed with a plurality of parallel ribs 44 separating and holding in place individual slides. The slide magazine is open at the top (i.e. the side facing towards the projection axis), and at the bottom at 64, and is provided with the usual rack-teeth 43 to cooperate with an indexing pinion 120 (FIG. 6) connected for rotation by the magazine-advancing mechanism.

Thus the fore-and-aft magazine tunnel forms the middle section of a three-deck construction. Supported on the top of the magazine tunnel are shown the usual optical components of a slide projector, such as the projection lamp 46, surrounded by the chimney 48, which in turn supports the rear mirror 50, and a condensing lens 52. A slide-support bracket 54 has an open window 58, in registry with the optical projection axis, on each side of which are mounted the slide guides 56. Slot 60, formed on the top wall of the magazine tunnel 30, and adjacent to the bracket 54, allows individual slides to be lifted by pusher 66 from their nesting position in the magazine, and moved in front of the window 58, into the projection position, the imaging rays passing through the transparent slide and on to the projection lens 16. Between the first condensing lens 52 and the slide support bracket 54, more condensing and/or heat absorbing elements may be placed, for example, condensing lens 53 (see FIGS. 4 and 7).

The lifting of the individual slides from their nesting position in the magazine to the slide support 54, is accomplished, as above-described, by means of pusher 66, which passes freely through the open bottom 64 of the slide magazine, and through slot 61 pierced in the floor of the magazine tunnel.

Referring to FIG. 2, the pusher 66 is secured through spacer 68 to "guillotine" (for example a substantially U-shaped member) 70. Guillotine 70 is slidably contained by means of slots or cutouts 72, 74, and two more (not shown) on the opposite side, formed on the top and bottom members of magazine tunnel 30 and 32, and may thus freely move up and down carrying with it the pusher 66. (If the alternative tunnel format of FIG. 3 is employed, the guillotine 70 may be slidably supported by means of plastic or metallic U-shaped brackets 71 and 73, or the like, secured to each side of the magazine tunnel).

The above-described slide-lifting assembly formed by members 70 (the guillotine), 66 (the pusher) and 68 (the spacer), may be manually activated up and down, or may be preferably motor-driven. Motive power may be provided in various ways, and one will be described here, as an illustration, reference being made to FIGS. 2, 4, 5 and 6. Two members 80 and 82 are hingedly secured to magazine tunnel member 30, for example by means of pins 84 and 86, and their other ends freely pass through slots 81 and 83 of the guillotine member 70. Two more members 92 and 92 (actually only one, say 94, suffices) are hingedly secured to members 80 and 82, for example by means of pins 88 and 90. Member 94 is formed with a slot 96, (see FIG. 4), through which passes pin 98 secured to gear 100, whose shaft 102 is bearingly supported on tunnel member 32 at 104 and 106 (see FIG. 6), so that while gear 100 rotates about its shaft 102, it forces guillotine 70 to slide up and down. Gear 100 is coupled, by means of a series of gears, for example gears 110 and 111, to pinion 112 secured to the motor shaft of electric motor 114 (see FIGS. 4 and 5).

Once a slide has been projected and returned to its nesting position in the magazine 42, it is necessary to advance it in order to expose to pusher 66 the following slide. This may be accomplished in a number of ways, and again, for illustrative purposes, one will be presently described. It has already been mentioned that the bottom of magazine 42 carries a lengthwise rack 43 (see FIG. 2). When the magazine is inserted in the magazine tunnel 11 and sufficiently advanced, the rack engages the teeth of pinion 120, which is permanently secured to shaft 122 journalled on member 32 at 124 and 126 (FIG. 6). Freely rotating about the shaft 122 is Geneva gear 130, having a number of slots 131 equal to the number of teeth of pinion 120. Flanged wheel 132 is permanently secured to shaft 122 and has two pins 125 and 127, which engage into corresponding holes in the Geneva gear, so that when external knob 128 is at the position shown in FIG. 6, the Geneva gear 130 and the pinion 120 are coupled through shaft 122 and rotate together. But if knob 128 is pulled away in the direction of arrow A, pins 124 and 126 disengage from the Geneva gear 130, and the operator may by rotating knob 128 (and thus pinion 120), manually advance or retract the slide magazine 42.

Concentrically and permanently secured to gear 100 is the usual Geneva cam 140 and the usual Geneva driver or pin 142, which engages and intermittently drives the Geneva gear 130 in the known fashion, so that after a slide has been returned to its nesting position in the magazine, i.e. after the guillotine 70 has reached its lowermost travel position, the Geneva pin 142 engages the Geneva gear 130 and turns it, together with pinion 120 by one tooth, thus advancing the slide magazine by one step and exposing the following slide to the pusher 66.

It is evident that while the magazine advances, i.e. while the Geneva gear turns by one tooth, the guillotine 70 must not move. This is made possible by providing bracket 94 with the above-described slot 96 and spacing pin 98 and Geneva pin 142 at properly calculated positions on the Gear 100, as shown in FIG. 4.

Automatic cycling of the magazine and its associated motive power can be readily provided by position-operated switches (not shown for clarity) for engagement with appropriate cams, for example cam 150 on wheel 152 (see FIG. 2), permanently attached on shaft 102. Remote control, by cabled wiring, or other system, is also simple and easy to provide, in the well-known manner.

Having described the various elements and members, it will be helpful to recite a full cycle of operation. The individual slides are inserted in the magazine 42, which is placed inside the tunnel 11 and advanced until its rack 43 engages pinion 120. Upon switching the automatic cycling, motor 114 rotates gear 100 which; by means of pin 98 lifts bracket 94, lifting bracket 82, lifting guillotine 70 and its associated pusher 66, which, in turn, lifts an individual slide into the projection position on slide-support 54. After projection, gear 100 starts rotating again, pulling guillotine 70 down, and the slide returns by gravity to its nesting position in the magazine. The gear 100 continues rotating, but because of slot 96 the guillotine 70 remains in its lowermost position, while the Geneva pin 142 engages the Geneva gear 130, which turns pinion 120 by one tooth and thus advances the magazine by one step, in preparation of the following projection cycle.

In order to obtain a brilliant projection image, the projection lamp must be of the highest possible intensity and this generates large quantities of unwanted heat, which must be dissipated. Therefore, the great compactness of the projector of the present invention make it necessary to provide forced air circulation. This may be achieved in a number of ways, and the inventor of the present invention has experimented, designed and built several prototypes incorporating various ways for providing such forced air circulation.

FIG. 4 illustrates an arrangement especially suitable when used with the so-called low voltage, quartz-iodine projection lamps, which operate at maximum illuminating efficiency at a high temperature. Therefore, while the chimney 48 encloses the lamp and maintains it at the desired high temperature, a motor-driven fan 160 forces air around the chimney, on the condensing lenses 52 and 53 and through openings and slots on slide support bracket 54 (such as 162 and 164, FIG. 5) cools the slide or transparencies.

It is sometimes desirable to feed the projection lamp with a voltage different from that available at the mains. In such cases, a transformer may be conveniently placed in the lower deck below the magazine tunnel or elsewhere.

FIG. 7 illustrates another fan-cooling arrangement, especially useful when the magazine tunnel has a configuration substantially as that illustrated in FIG. 3. In the arrangement of FIG. 7 the motor-fan assembly 170 is placed below the magazine tunnel. Air vanes or deflectors have been found very useful, but are not shown in this illustration because their most effective position is a function of the type of the projection lamp and the design of the various other elements of the projector.

Figure 8:
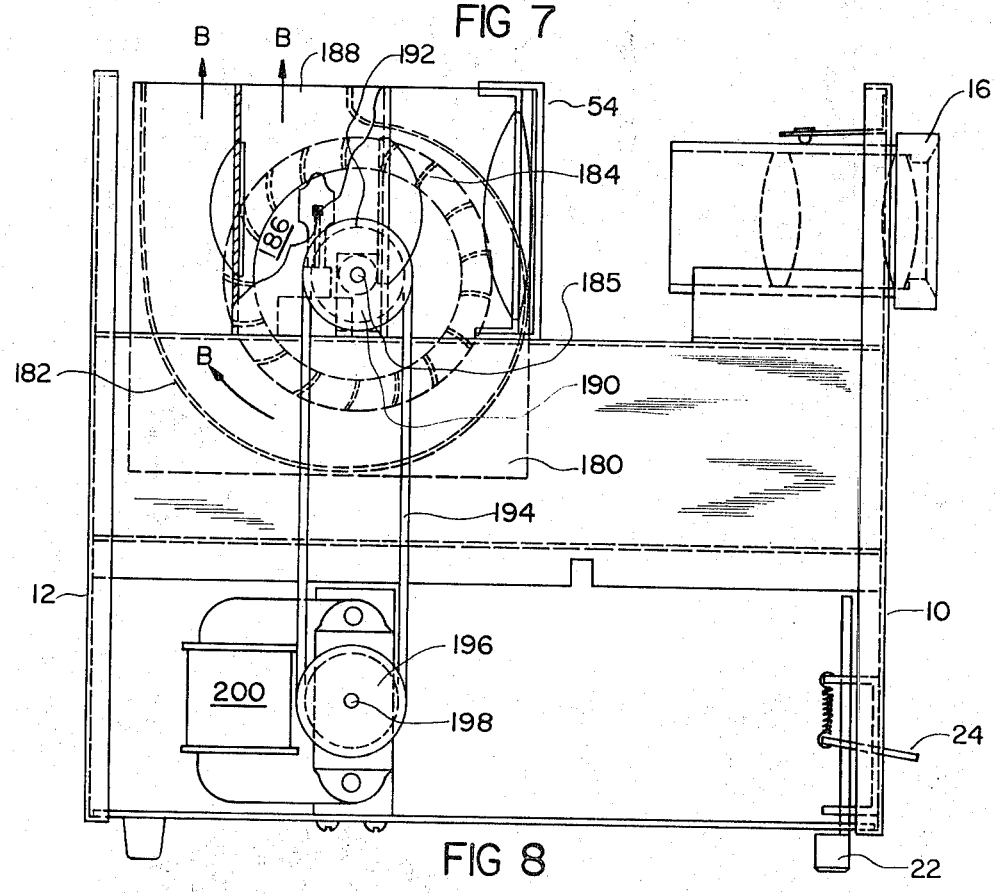
FIG. 8 is a side elevation of still another embodiment of the present invention, with some parts not shown.

FIG. 8 illustrates still another forced air cooling method which was found to be the most efficient when high intensity lamps, generating vast amounts of heat, are used.

Instead of pushing air, a turbine draws air away from the lamp, condensing lenses and the slide. The turbine assembly is mounted on plate 180 and includes the usual turbine scroll 182 (having the desired expansion rate in order to provide, at a given impeller speed, the optimum air flow), blower wheel (impeller) 184, air intake opening 186. It draws air through the air intake 186 and discharges it through the exhaust opening 188 in the direction of arrows B.

The turbine assembly is permanently secured to the far side of the magazine tunnel and the turbine shaft 185 is bearingly supported by bracket 190 and has secured at its other end pulley 192, around which passes belt 194 coupled to another pulley 196, secured to motor shaft 198 of motor 200.

Philosophy of Invention

Having described some preferred embodiments, it might be useful to analyse the philosophy of the invention:

I. Requirements

1. The mounting of projection transparencies on individual frames has several advantages, such as easy editing, updating and rearrangement of a particular sequence. It has inherent disadvantages:
   a. accidental mixing of a sequence.
   b. accidental projection in an "upside down", or generally, wrong position.
   c. the manual insertion and removal of individual transparencies in and out of the projector is a rather tedious operation.
2. The so-called "magazine", such as item 42 in FIG. 2, eliminates to some degree the above disadvantages, and has become the accepted medium for storing slides. Of course, it becomes really useful only if it can be inserted, fully loaded with slides, in a projector and the slides sequentially and automatically projected.
3. By itself, the magazine described in (2) above solves the problem 1 (c) above, but does not solve the problems 1(a) and 1 (b), and therefore, a projector of good design must have "editing" facilities. Actually this means that the operator must have the option of removing a slide while it is projected, reinsert it in the projector in the correct or desired projecting position, or substituting another slide altogether.
4. The main object of a projector is to project the slides, and it must be capable of doing so with the desired magnification, light intensity and, of course, the picture must be sharp and well defined. This implies good projection optics and a sufficiently bright illumination source, which, in turn, requires adequate cooling.

II. The Solution

The inventor of the present invention believes that most projectors now available on the market, have been designed in an unreasonable and haphazard manner, as a result of which, their size, weight and general arrangement of their elements and components are not entirely logical.

On the other hand, the entire concept of the projectors of the present invention is an attempt to rationally build projectors around the basic design requirements of (I) above, thus:

1. Since the light source produces heat, it must be located in the uppermost place of the apparatus.
2. Since editing is very useful, a slide in the projection position should be directly accessible, and thus the projection position should also be as close to the top surface as possible.
3. Since gravity is a universal force, and is everywhere available, it should be used as much as possible. Thus the magazine should be either under or over the projection axis, but in order to fulfill the requirements of II(1.) and II(2) above, it can only be below the projection axis. Thus, a slide may be pushed out of the magazine by an appropriate mechanism, and be gravity-fed back into it.
4. Because it is necessary to adjust the inclination of the projection axis (have an adjustable leg), the magazine must be at some distance away from the surface on which the apparatus rests during projection, for example, a table or shelf (otherwise the lower edge of the magazine in its outermost position will hit this surface). Thus, in order to utilize the space below the magazine and at the same time contribute to the stability of the apparatus, motors, transformers and other heavy elements, naturally belong below the magazine.
5. Servicing of machines must be easy. Once the cover is removed all elements must be readily accessible and the apparatus must be fully operational with the cover removed, in order to localize the trouble by visual inspection.
6. In order to satisfy the above, the projector may be built around an H-frame, i.e. a front wall and a back wall held together with an interconnecting member, which is naturally the magazine tunnel. Over the tunnel, i.e. on the uppermost deck, the projection elements may be mounted, while below the tunnel, the motors, transformers and other heavy components may be conveniently placed.

Gears and other members belonging to the slide-changing mechanism may be also conveniently mounted or suspended on the top, bottom and sides of the tunnel, while the slide pusher may most naturally be supported by a substantially U-shape member straddling the tunnel. Great economies in space, weight and cost are thus possible, while the apparatus is aesthetically very acceptable and easy to assemble and service.

The invention has been described by reference to certain preferred embodiments thereof, however, it will be understood that the principles of the invention can be carried out by various modification, within the spirit of the invention, and therefore it is not intended to exclude variations and details which properly fall within the scope of this invention

I claim:

1. A slide projector built on a substantially H-frame, its front and back walls forming parts of the vertical members of said H-frame, while the interconnecting horizontal member is of substantially rectangular tubular cross section forming the projector's fore and aft magazine tunnel and thus defining a three-deck construction, the upper deck supported on said tunnel containing the optical projection means, while the lower deck below said tunnel contains electromechanical means, said projection means including a slide support for receiving and holding a slide in the proper position for optical projection, said magazine tunnel adapted to slidably receive a magazine tray supporting a plurality of said slides; indexing means for indexing said magazine tray stepwise to expose said slides therein, one at a time in succession, to an opening at the ceiling of said magazine tunnel, said opening lying substantially under said slide support and pushing means engageable with said slides for pushing them, one at a time, through said opening and onto said slide support for projection and thereafter lowering them back into said magazine tray; said pushing means comprising a pusher member passing through an aperture at the bottom of said magazine tunnel and freely through the bottom of said magazine tray and thus contacting and pushing the lower edge of said slides, one at a time, said pusher member secured to a U-shaped guillotine member straddling said magazine tunnel and slidably supported on said magazine tunnel for free reciprocating motion along a plane perpendicular to the longitudinal axis of said magazine tunnel.

2. A slide projector according to claim 1, wherein said magazine tunnel is formed by two substantially U-shaped members fixedly secured to one another, one of said U-shaped members substantially constituting three walls of said magazine tunnel and the other U-shaped member constituting substantially the fourth wall of said magazine tunnel.

3. A slide projector according to claim 1, wherein said magazine tunnel is formed by four substantially U-shaped members, each of said U-shaped members consisting of a substantially platelike portion forming one of the four walls of said magazine tunnel, said platelike portions having perpendicularly upstanding portions (thus forming the legs of the U-shape) employed for securing said U-shaped members to one another and also utilized for journaling and securing parts and components of said projector.

4. A slide projector according to claim 3, wherein said guillotine member is slidably contained and supported for said reciprocating motion by notches formed on said upstanding portions of said U-shaped members.

5. In a slide projector of the type having: optical slide projection means for the projection of optically projectable slides, a magazine tunnel adapted to slidably receive a magazine tray supporting a plurality of such slides, indexing means for indexing said magazine tray stepwise to expose said slides, one at a time, to an opening at the ceiling of said magazine tunnel, pushing means engageable with said slides for pushing them, one at a time, through said opening and onto a slide support for projection, and thereafter lowering them back into said magazine tray, said pushing means comprising a pusher member passing through an aperture at the bottom of said magazine tunnel and freely through the bottom of said magazine tray and thus contacting and pushing the lower edge of said slides, one at a time, the improvement comprising: a U-shaped guillotine member secured to said pusher member, said guillotine member straddling said magazine tunnel, and slidably supported thereon, for free reciprocating motion along a plane perpendicular to the longitudinal axis of said magazine tunnel.

6. A slide projector according to claim 1, wherein a link member has one end pivotally supported upon said magazine tunnel and the other end engages said guillotine member, and a second link member has one of its ends pivotally supported on first-named link and its other end is pivotally supported on a rotating member, said rotating member journalled upon said magazine tunnel, and thus while said rotating member rotates, it forces said guillotine into said reciprocating motion.

7. A slide projector according to claim 1, wherein said guillotine and said indexing means are motor-actuated through gear means in such a fashion that said indexing means move said magazine, one step at a time, only after said pushing means have returned said slide into said magazine.

8. A slide projector according to claim 6, wherein said wheel is motor actuated.

9. A slide projector according to claim 1, including a motor-driven fan between said projection lamp and said back wall to cool said projection elements and said slide.

10. A slide projector according to claim 1, including a motor-driven fan in said lower deck to cool said projection elements and said slide.

11. A slide projector according to claim 1, including an air turbine whose housing is supported on one side wall of said magazine tunnel and whose air intake substantially faces said lamp and thus cools said lamp.

12. A slide projector according to claim 11, wherein the impeller shaft of said air turbine is supported by bearing means secured to said magazine tunnel.

13. A slide projector according to claim 12, wherein a pulley is secured to said impeller shaft, coupled through a belt to a second pulley secured to the shaft of an electric motor supported in said lower deck.

14. A slide projector according to claim 1, wherein a transformer in said lower deck feeds the proper voltage to said lamp.